United States Patent [19]
Kidd et al.

[11] Patent Number: 5,329,614
[45] Date of Patent: Jul. 12, 1994

[54] METHOD AND APPARATUS FOR ENLARGING GRAY SCALE IMAGES

[75] Inventors: Robert C. Kidd; Debora I. Y. Grosse, both of Ann Arbor, Mich.

[73] Assignee: Unisys Corporation, Bluebell, Pa.

[21] Appl. No.: 651,769

[22] Filed: Feb. 7, 1991

[51] Int. Cl.$^5$ ............................................. G06F 15/62
[52] U.S. Cl. .................................... 395/139; 395/133; 395/162
[58] Field of Search ............................. 395/133–139, 395/150, 151, 128, 132, 162; 382/50, 47

[56]  References Cited
U.S. PATENT DOCUMENTS

| | | | |
|---|---|---|---|
| 4,153,896 | 5/1979 | White | 340/731 |
| 4,254,409 | 3/1981 | Busby | 340/731 |
| 4,267,573 | 5/1981 | Chaikin | 364/515 |
| 4,303,948 | 12/1981 | Arai et al. | 358/287 |
| 4,357,604 | 11/1982 | Imazeki et al. | 340/731 |
| 4,367,533 | 1/1983 | Wiener | 340/731 X |
| 4,409,591 | 10/1983 | Simkovitz | 340/711 |
| 4,569,081 | 2/1986 | Mintzer et al. | 382/47 |
| 4,893,258 | 1/1990 | Sakuragi | 395/139 |
| 5,170,442 | 12/1992 | Murai et al. | 382/50 X |

OTHER PUBLICATIONS

IBM Journal of Research and Development–Jan. 1987, pp. 23–24.
"Interpolation and Decimation of Digital Signals–A Tutorial Review", Chochiere at Rabener, Procedures of the IEEE, Mar., 1981, pp. 300–331.

Primary Examiner—Heather R. Herndon
Assistant Examiner—Almis Jankus
Attorney, Agent, or Firm—Harness, Dickey & Pierce

[57] ABSTRACT

An image scaler which enlarges gray scale images, comprised of any number of gray scales, by any rational factor expressible as a ratio of integers between 1:1 and 2:1. The scaling method is "data conservative" in that it always keeps all of the original gray scale pixel values of the input image, generating additional pixel values as needed to produce an enlarged output image. The scaler generates an insertion number sequence for determining where to insert vacant pixel storage locations and calculates gray scale values for those newly created vacant locations by interpolating between values of neighboring pixels.

15 Claims, 3 Drawing Sheets

Inserted Pixel A = (Current + RAM Delayed)/2
Inserted Pixel B = (Current + Previous)/2
Inserted Pixel C = (Current + RAM Delayed + 2 * Previous A)/4

METHOD AND APPARATUS FOR ENLARGING GRAY SCALE IMAGES

BACKGROUND AND SUMMARY OF THE INVENTION

The invention relates generally to digital image scaling whereby a raster image of one particular spatial resolution is converted to a like image having a different spatial resolution. More particularly, the invention relates to a method and apparatus for enlarging gray scale images.

Image scaling is often employed when images created, processed, or stored on one system or device are subsequently transferred for use, display, or output to another device. Image enlarging is especially useful where raster images which require large amounts of computer memory are stored in compressed form and then enlarged for display or hardcopy output.

Various scaling methods are known for enlarging black and white binary images but few of these are useful for gray scale images. Also, many of these methods enlarge an image only by a fixed amount. Finally, the techniques employed often result in many or most of the output data points being generated by the algorithm, resulting in computational inefficiency and possible degradation of image quality.

There is therefore seen a need for a fast and computationally efficient method for enlarging gray scale images by a variable amount. It is also desirable that this method be useful on images having any number of gray levels and that it output images of as good or better quality than those produced using other known techniques. Finally, such method should be easily and conveniently implementable in hardware.

The image scaler of the present invention bidirectionally enlarges gray scale images, comprised of any number of gray scales, by any rational factor expressible as a ratio of integers between 1:1 and 2:1. The method used to perform the scaling is "data conservative" in that it always keeps all of the original gray scale pixel values of the input image, generating additional pixel values as needed to produce an enlarged output image. The image scaler of the invention has two primary components, (1) the method for determining where to insert vacant pixel storage locations needed to produce an enlarged output image and (2) the technique for generating gray scale values for those newly created vacant locations.

To determine where to insert data points an insertion number sequence is generated as a function of the scale factor. The numerical values of the insertion sequence are applied to the image in a repeated fashion such that each pixel and each row of the input image has one sequence value associated with it. The sequence value associated with each pixel or row is interpreted by the scaler as the number of pixel or line units to increment a memory pointer before storing the next pixel value, the address for the next pixel being incremented by the insertion sequence value. Where a storage location is left vacant between original data points, the next pixel value is read and stored at the location specified by the incremented memory pointer, and then a gray scale value for the vacant pixel is calculated and the vacant memory location is filled with the calculated value.

A gray scale value for an inserted pixel is calculated by the scaler as a predetermined function of the current pixel and a previously read and stored pixel. This predetermined function could be simple averaging. For example, in an inserted column, the gray scale values of the two neighboring pixels in the same row could be averaged. For pixels in an inserted row, the neighboring pixels above and below in the same column could be averaged. As the scaler completes the calculations for the values for inserted pixels in a scaled or inserted row, it outputs "words" consisting of a fixed number of adjacent pixels in two parallel outputs, one consisting of an enlarged original row and the other being used to output an added row where necessary.

For a more complete understanding of the invention, its objects and advantages, reference may be had to the following description and the accompanying drawings.

BRIEF DESCRIPTION OF THE DRAWINGS

FIG. 5 is a schematic diagram of the apparatus of a preferred embodiment of the present invention.

DESCRIPTION OF THE PREFERRED EMBODIMENT

The present invention enlarges gray scale raster images by inserting additional rows and columns of pixels into the original input image pixel array. The method of the invention is "data conservative" in that all gray scale pixel values of the original image are retained in the enlarged image. Gray scale values for inserted pixels are computed by interpolating between values of neighboring pixels.

The method of enlarging an image begins with a scale factor input. In the preferred embodiment, this factor can be any rational factor expressible as a ratio of integers between 1:1 and 2:1. From this scale factor, an ordered data insertion number sequence, used to determine where in the original image to insert additional rows and columns of vacant pixel locations, is calculated. The number sequences generated in the preferred embodiment consist entirely of 2s and 1s although any other set of values such as 1s and 0s could be used if more convenient for hardware implementation. A list of insertion sequences generated for various scale factors is shown below. For convenience, insertion sequences for various scale factors such as those below may be pre-calculated and stored for use in a look-up table.

| SCALE FACTOR | INSERTION SEQUENCE |
| --- | --- |
| 9:8 | 2 1 1 1 1 1 1 1 |
| 10:8 | 2 1 1 1 |
| 11:8 | 2 1 2 1 1 2 1 1 |
| 12:8 | 2 1 |
| 13:8 | 2 2 1 2 2 1 2 1 |
| 14:8 | 2 2 2 1 |
| 15:8 | 2 2 2 2 2 2 2 1 |

As an image is read into the scaler, one sequence value is associated with each pixel and each row being read in. Values from the insertion sequence are assigned in order, beginning over again after the last number in the sequence has been assigned, until every pixel and every row has a sequence value associated with it. The sequence value associated with a pixel or row is interpreted by the scaler as the number of pixel or line units to increment a memory address pointer prior to storing the next pixel value. Thus, for a pixel whose insertion sequence value is 2, an address pointer is incremented so as to leave a vacant pixel storage location between that pixel and the next pixel to be read in. Similarly, rows having a sequence value of 2 are followed by enough contiguous empty memory locations to hold a scaled line of data. For each pixel or line whose sequence value is 1, the next pixel to be read in is stored immediately following the previous pixel.

Figure 1:
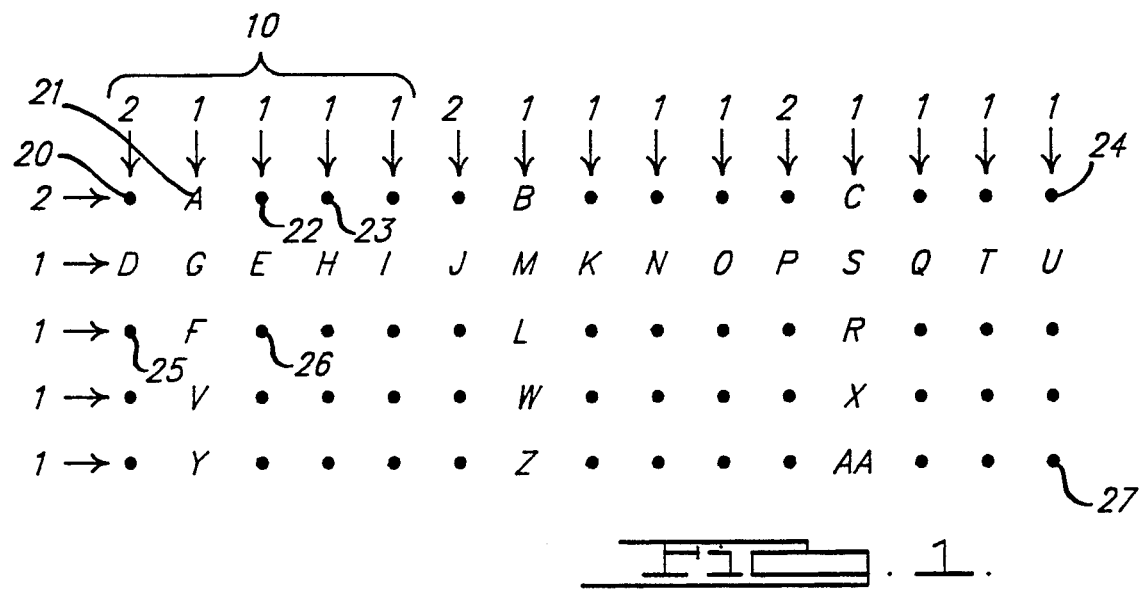
FIG. 1 is a diagram showing the insertion sequence values as applied to an input image to be scaled by a factor of 10:8 as well as the vacant pixel locations to be added.

FIG. 1 shows a schematic representation of an image scaled according to the present invention. As the scale factor for this image is 10:8, the insertion sequence is 2 1 1 1 as shown in the aforementioned table. Small dots in FIG. 1 represent original data points of the input image. Letters in the figure represent inserted empty data points arranged alphabetically according to the order in which they are filled. As shown in FIG. 1, each pixel or row having a sequence value of 2 is followed by an inserted empty point or row of empty data points.

As illustrated by FIG. 1, the gray scale value for a pixel in an inserted column, for instance pixel A 21, is calculated by averaging the gray scale values of pixels on both sides of the inserted pixel in the same row, in this case pixels 20 and 22. The value for a pixel in an inserted row such as pixel D, is calculated by averaging the gray scale values of the pixels immediately above and below the inserted pixel in the same column, pixels 20 and 25. For pixels in an inserted row and column, namely pixel G in FIG. 1, the gray scale value is calculated using the average of the gray scale values of four neighboring pixels, 20, 22, 25, and 26. Since this is equivalent to the average of the gray scale values of pixels A and F, in one approach described below G is calculated using the gray scale values of pixels A and F. In a second approach, also described below, an equivalent value for G is calculated from the three pixels 22, 26, and D.

In the preferred embodiment, for the calculations resulting in a fractional gray scale value, the resulting value is rounded toward the gray scale value of the input image equated with the darkest gray level, or black.

The two trivial cases, in which the scale factor is either 1:1 or 2:1 are handled separately in this embodiment. For a 1:1 scale factor the input image is output as the scaled image. For a scale factor of 2:1, replication, where each pixel vacancy is filled with the immediately preceding pixel value, and each row of contiguous pixel vacancies is filled with the values of the immediately preceding row of pixels, was found empirically in this embodiment to produce a more visually pleasing dithered image than interpolation.

The scaling operation according to the method of the present invention can be performed in several ways. In one approach, the scaler is capable of enlarging an image as it is being transferred between devices. Gray scale values for inserted pixels can be calculated as pixels are read from the input image into the scaler. Under this approach, the values for the vacant pixels are filled in using the order shown alphabetically in FIG. 1.

For instance, pixel 20 from the input image is read and stored. Since pixel 20 has a sequence value of 2 associated with it, vacant memory location 21 is inserted adjacent to pixel 20. Pixel 22 from the input image is then read in and stored. The gray scale value for vacant location 21 is then calculated by averaging the gray scale values of pixels 20 and 22. Pixel 23 is read and stored and this sequence is repeated until the entire first row has been read and scaled. The scaler then outputs the row of scaled data ending with pixel 24.

As the sequence value associated with the first row (that row beginning with pixel 20) is 2, vacant memory locations D, G, E, H, I, J, M, K, N, O, P, S, Q, T, and U are created after pixel 24. The gray scale value for pixel 25 is then read and stored and a value for pixel location D is computed by averaging the gray scale values for pixels 20 and 25. Pixel 26 is read in and the value of location E is then computed by averaging pixels 22 and 26. The value for location G is calculated by averaging the values obtained above for vacant pixel locations A and F. Then, the rest of the inserted pixels of the second row are calculated in the same fashion. The inserted row and the enlarged row beginning with pixel 25 are then output. This sequence is repeated until the entire image has been enlarged.

In a second approach, pixels are read one by one. After each pixel is read, one to four pixels are output, corresponding to the pixel just read and any adjacent inserted pixel locations. Under this approach, a windowing technique is utilized in calculating gray scale values for inserted pixel locations, starting from the beginning of the image and proceeding towards the end, in a single pass over the image. In a preferred embodiment, the image is understood to begin with the pixel in the lower right-hand corner, pixel 27 in FIG. 1, and end with the pixel in the opposite upper left-hand corner, pixel 20.

Figure 2:
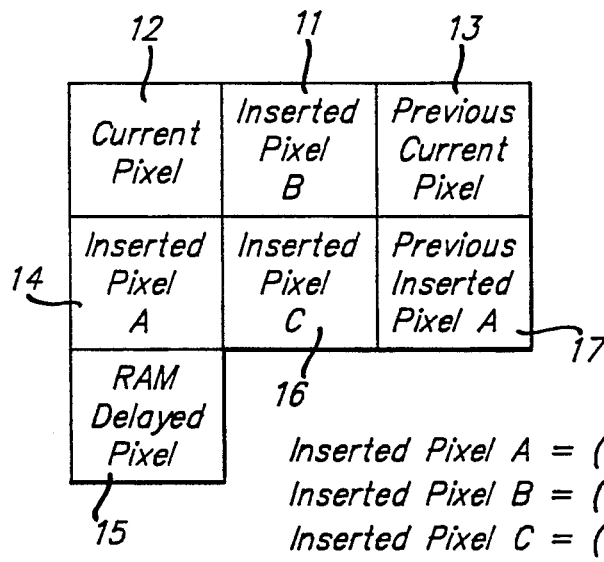
FIG. 2 is a diagram of seven neighboring pixels and the equations with which gray scale values for inserted pixel locations are calculated.
Figure 3:
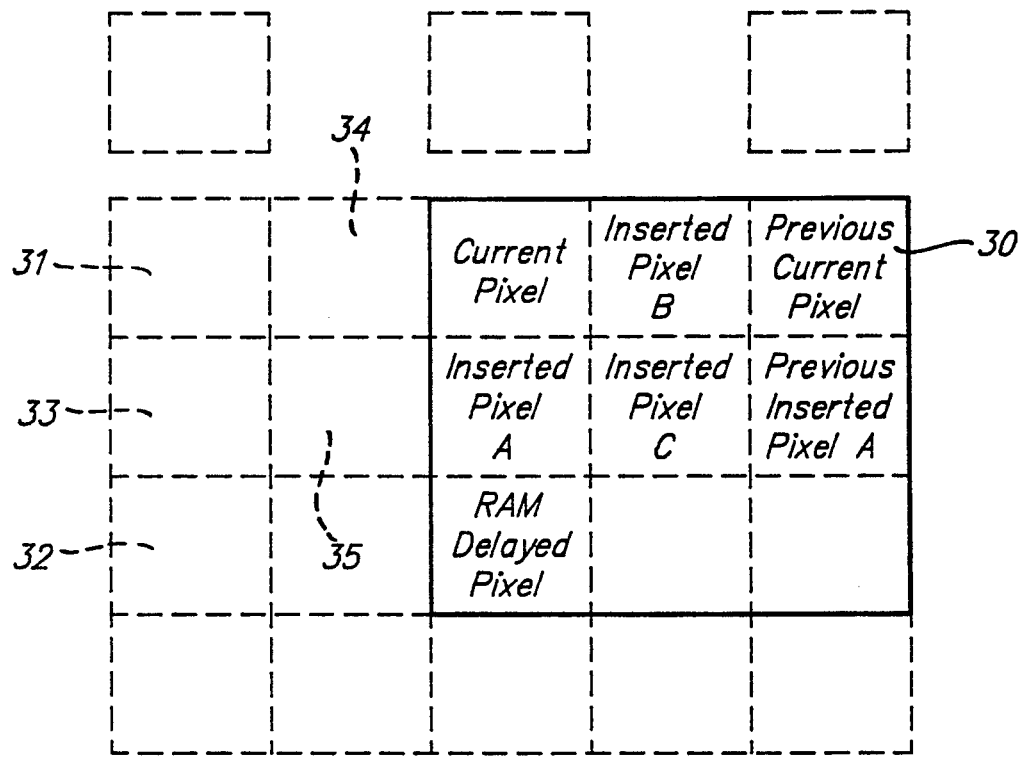
FIG. 3 is a diagram showing the windowing technique of a preferred embodiment of the present invention.

The window 30 shown in FIG. 3 moves from right to left and bottom to top along an image. Gray scale values are calculated for vacant memory locations lying within the window by the same equations shown in FIG. 2. If "current pixel" 12 has a sequence value of 2 associated with its column, pixel B 11 is inserted. The gray scale value for a pixel in an inserted column, for instance "inserted pixel B" 11, is calculated by averaging the gray scale values of pixels on both sides of the inserted pixel in the same row, in this case pixels 12 and 13. If "current pixel" 12 has a sequence value of 2 associated with its row, pixel A 14 is inserted. The value for a pixel in an inserted row such as pixel 14, is calculated by averaging the gray scale values of the pixels immediately above and below the inserted pixel in the same column, pixels 12 and 15. If "current pixel" 12 has sequence values of 2 associated with both its row and column, pixel C 16 is inserted. For pixels in an inserted row and column, namely "inserted pixel C" 16 in FIG. 2, the gray scale value is calculated using three neighboring pixels, 12, 15, and 17.

As shown in FIG. 3, the window 30 will next move so that pixel 31 becomes the current pixel, pixel 32 becomes the RAM delayed pixel, and vacant pixel locations 33, 34, and 35 become the new inserted pixels A, B, and C if required by the sequence values associated with the row and column of pixel 31. The window moves from the beginning of the image towards the end until the entire image has been enlarged.

Figure 4:
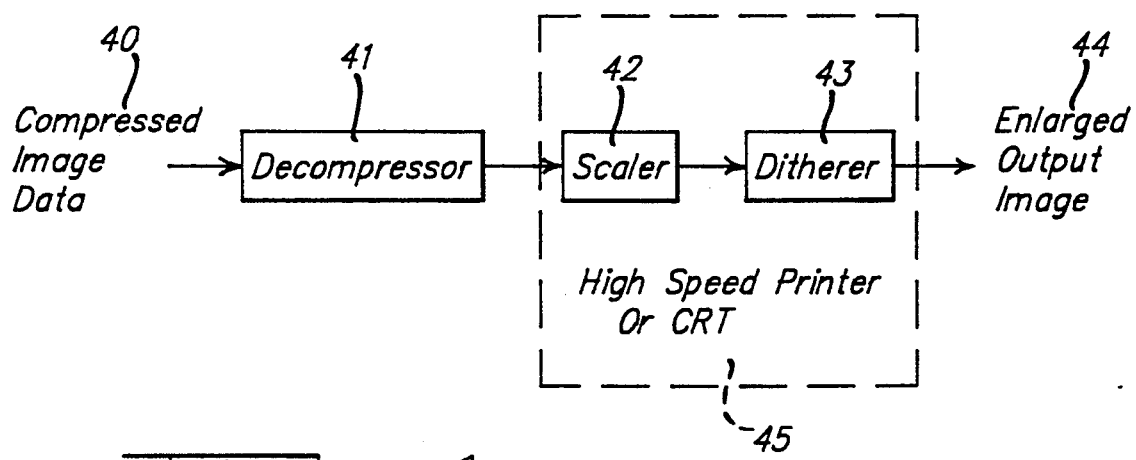
FIG. 4 is a block diagram showing an exemplary application of the invention.
Figure 3:
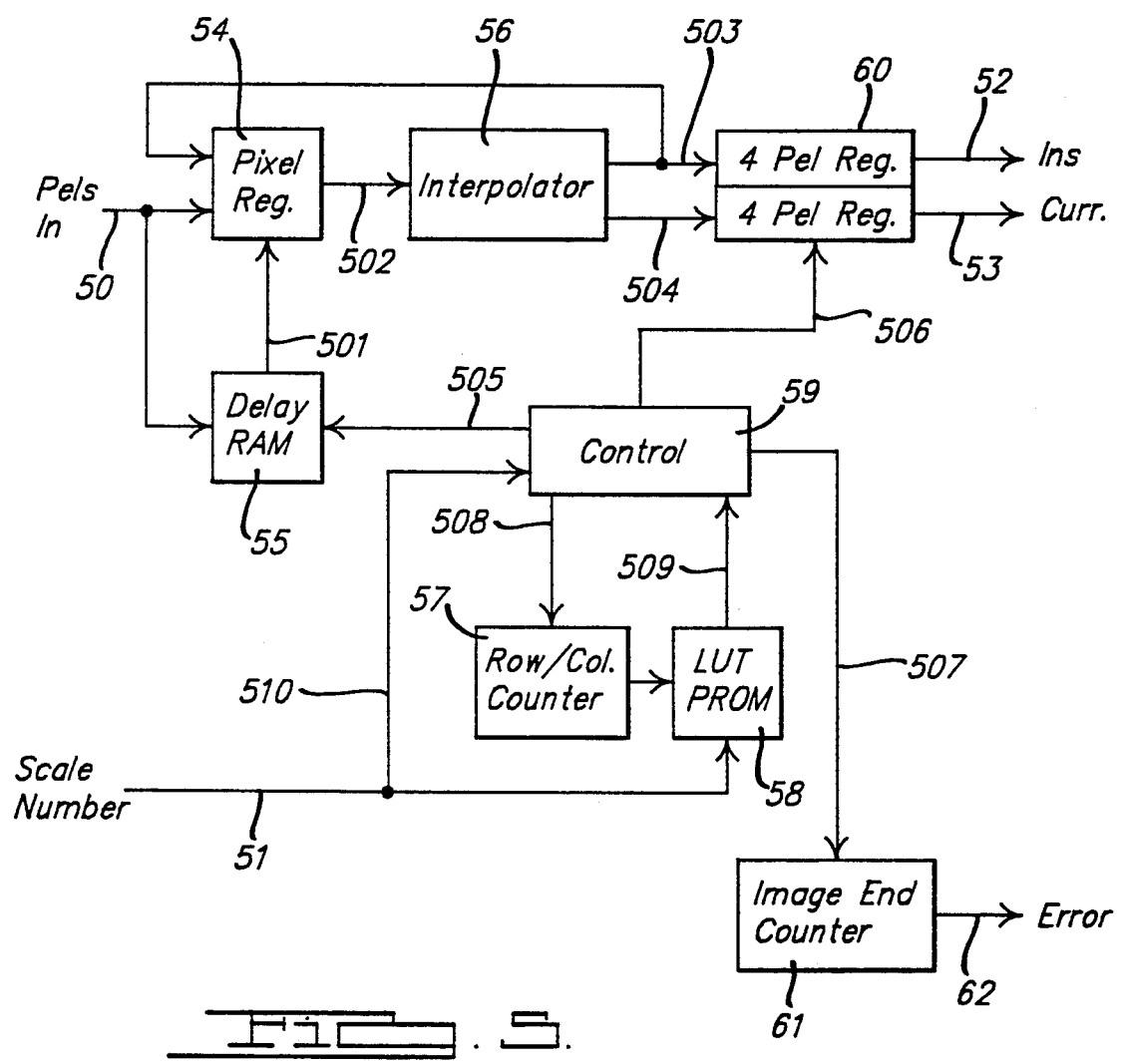

Hardware incorporating the above methods can be configured in a number of ways. In one exemplary embodiment shown in FIG. 4, the scaling method is implemented in a single card which fits into the controller of a high speed printer or CRT 45. As shown in FIG. 4, a compressed image 40 is decompressed in decompressor 41 to restore the original gray scale pixels. The image is then scaled using the scaler 42 of the present invention, and then dithered in ditherer 43 for hardcopy output or display as enlarged output image 44. This card is configured as shown schematically in FIG. 5.

As shown in FIG. 5, there are two inputs 50 and 51, one for the scale factor and one for pixels of the original image as they are read in. There are two parallel outputs 52 and 53 since the scaler may generate one or two rows of scaled pixels simultaneously for each input row, a current scaled row at output 53 and an inserted row at output 52.

Generally, as pixels are read in from the input image, gray scale values for those pixels are stored in pixel register 54. A delayed pixel from the previous row in the current column is retained in delay RAM 55 whose output is coupled to pixel register 54 via bus 501 so as to be available to interpolator 56 via bus 502 for calculating values for vacant pixel locations lying in inserted rows. Those pixels available to interpolator 56 are those shown in FIG. 2.

A row/column counter 57 is also provided to keep track of the current and previous row and column as is a look-up table PROM 58 which contains the data insertion number sequences used to determine where vacant pixel locations are to be added.

Two 4-pixel output registers 60 are coupled to outputs 503 and 504 of interpolator 56. Output 503 of interpolator 56 is additionally coupled to an input of pixel register 54.

A control unit 59 coordinates the functions of the various functional units of FIG. 5. Control unit 59 has an input 510 coupled for receipt of the desired scale factor and has output 505 coupled to delay RAM 55, output 506 coupled to output registers 60, output 507 coupled to image end counter 61, output 508 coupled to row/column counter 57, and input 509 coupled to look-up table PROM 58.

Image end counter 61 performs an overall sanity check upon the scaling of an image and outputs an error signal on output 62 whenever the sanity check fails.

The apparatus of FIG. 5 allows processing of pixels in a pipelined mode, at a constant input pixel rate, regardless of the scale factor, allowing processing of pixels as fast as a previous processing stage can output them. Therefore, the previous stage does not have to pause or slow down even though the image size is increased. This hardware implementation also requires minimal buffering, only one raster scan worth of unscaled data, and all calculations to generate a pixel can be performed in one clock cycle. Calculations are performed in parallel to generate up to three inserted pixels in one clock cycle.

While the present invention has been described in connection with the presently preferred embodiments, certain modifications can be made without departing from the spirit and scope of the invention as set forth in the appended claims.

What is claimed is:

1. Apparatus for enlarging, by a given factor of scale, a gray scale input image having ordered rows and columns of digitized picture elements (pixels), each said pixel of said input image having a gray scale value, the apparatus comprising:
    an input register for receiving gray scale pixel values of the input image, said input register having a plurality of pixel value storage locations;
    a scale factor input register for receiving the given factor of scale;
    means coupled to the scale factor input register for generating an ordered sequence of numbers as a function of the given factor of scale;
    means for associating one number of said ordered sequence of numbers with each pixel and each row of pixels in the input image;
    means coupled to the input register and the means for generating for leaving a vacant pixel value storage location between received pixel values of the input image, said vacant pixel value storage location being adjacent the pixel value storage location of each pixel of the input image associated with a number of a predetermined value and for leaving a plurality of vacant pixel storage locations between received pixels of the input image, each of said plurality of vacant pixel value storage locations being adjacent the pixel value storage location of each pixel in each row of the input image associated with a number of the predetermined value;
    calculation means coupled to said input register for generating a gray scale value for each vacant pixel storage location as a function of neighboring pixel values; and
    means for outputting an enlarged image, said enlarged image comprising ordered rows and columns of pixels including all of said input pixel values and said calculated pixel values.

2. The apparatus of claim 1 further comprising an image end detecting means coupled to said means for inserting, the image end detecting means generating an error signal when a certain condition is met.

3. The apparatus of claim 1 further comprising an output register means for outputting an enlarged row of pixel values and an inserted row of pixel values, the output register means being coupled to the calculation means and the means for leaving.

4. Apparatus for enlarging by a given factor of scale a gray scale input image having ordered rows and columns of digitized picture elements (pixels), each said pixel of said input image having a gray scale value, the apparatus comprising:
    an input register for receiving gray scale pixel values of the input image;
    a scale factor input register for receiving the given factor of scale;
    means coupled to the scale factor input register for generating an ordered sequence of numbers as a function of the given factor of scale;
    means for associating one of said ordered sequence of numbers with each pixel and each row of the input image;
    means for leaving a vacant pixel value storage location between received pixel values of the input image, said vacant pixel value storage location being adjacent the pixel value storage location of each pixel associated with a number of a predetermined value and for leaving a plurality of vacant pixel storage locations between received pixels of the input image, said vacant pixel value storage locations being adjacent the pixel value storage location of each pixel in each row of the input image associated with a number of the predetermined value, the means for leaving being coupled to the input register and the means for generating;

calculation means coupled to said input register for calculating a gray scale value for each vacant pixel value storage location as a function of neighboring pixel values;

means for counting rows and columns of pixels, the means for counting being coupled to the means for generating and the means for leaving;

means for storing selected pixel values for use by the calculation means, the means for storing being coupled to the input register and the means for leaving;

an output register for outputting an enlarged row of pixel values and an inserted row of pixel values, the output register being coupled to the calculation means and the means for leaving;

means for outputting an enlarged image, said enlarged image comprising rows and columns of pixels including all of said input pixel values and said calculated pixel values; and image end detecting means coupled to the means for leaving for generating an error signal when a certain condition is met.

5. A method for enlarging a gray scale image by a given factor of scale comprising the steps of:

providing a first gray scale input image having ordered rows and columns of digitized picture elements (pixels), each said pixel having a value associated therewith;

providing a memory means for storing pixel data, said memory means including a plurality of pixel data storage locations;

determining an ordered sequence of numbers as a function of said factor of scale;

associating one of said numbers in said ordered sequence with each pixel and with each row of pixels in said first image;

reading said first image into said memory means by storing each said pixel value into a data storage location;

providing a vacant pixel value storage location adjacent the storage location for each pixel in said first image associated with a number of a predetermined value;

providing a plurality of vacant pixel value memory storage locations adjacent each row of said first image associated with a number of the predetermined value;

calculating a value for each said vacant pixel storage location, each said calculated value being a function of values corresponding to values of neighboring pixels; and producing an enlarged image utilizing all of said pixels of said input image and said calculated values.

6. The method of claim 5 wherein the value for a vacant pixel storage location is calculated by adding together values of two neighboring pixels adjacent said vacant pixel in the same row and dividing the sum by 2.

7. The method of claim 6 wherein the value for a vacant pixel storage location in an inserted row is calculated by dividing a sum of values of two neighboring pixels adjacent the inserted row in the same column by 2.

8. The method of claim 6 wherein the value for a vacant pixel storage location in an inserted row and column is calculated by a weighted averaging of at least three adjacent pixel values.

9. The method of claim 6 wherein any fractional value obtained is rounded towards a darkest gray level value.

10. The method of claim 7 wherein any fractional value obtained is rounded toward a darkest gray level value.

11. The method of claim 5 wherein any fractional value obtained is rounded towards a darkest gray level value.

12. The method of claim 5 wherein said scale factor is expressible as a ratio of integers between 1:1 and 2:1.

13. The method of claim 5 wherein said ordered sequence of numbers is calculated for a number of scale factors and stored in a look-up table.

14. The method of claim 5 wherein said ordered sequence of numbers consists of ones and twos.

15. The method of claim 14 wherein the predetermined value is two.

* * * * *